United States Patent [19]
Pearson et al.

[11] Patent Number: 5,812,704
[45] Date of Patent: Sep. 22, 1998

[54] METHOD AND APPARATUS FOR IMAGE OVERLAP PROCESSING

[75] Inventors: Eric C. Pearson, Waterloo; Thomas P. Pawelko, Cambridge, both of Canada

[73] Assignee: Focus Automation Systems Inc., Waterloo, Canada

[21] Appl. No.: 350,017

[22] Filed: Nov. 29, 1994

[51] Int. Cl.$^6$ .................................................. G06K 9/36
[52] U.S. Cl. ........................ 382/284; 382/282; 382/318
[58] Field of Search ............................... 382/284, 282, 382/318; 395/164, 448, 550, 650, 147; 358/261.1; 370/102

[56] References Cited

U.S. PATENT DOCUMENTS

| | | | |
|---|---|---|---|
| 4,566,038 | 1/1986 | Dimick | 358/261.1 |
| 4,916,551 | 4/1990 | Lin et al. | 358/483 |
| 5,018,078 | 5/1991 | Urabe et al. | 395/164 |
| 5,086,497 | 2/1992 | Horikawa et al. | 395/147 |
| 5,264,945 | 11/1993 | Kannegundla et al. | 358/444 |
| 5,276,848 | 1/1994 | Gallagher et al. | 395/448 |
| 5,313,620 | 5/1994 | Cohen et al. | 395/550 |
| 5,367,678 | 11/1994 | Lee et al. | 395/650 |
| 5,504,752 | 4/1996 | Okazaki et al. | 370/102 |

*Primary Examiner*—Jose L. Couso
*Assistant Examiner*—Anh Hong Do
*Attorney, Agent, or Firm*—Jeffrey T. Imai; Robert P. Stratton; Arne I. Fors

[57] ABSTRACT

An overlap processor receives and temporarily stores a plurality of aligned scan lines. Each scan line is representative of a lane or zone of an image. The processor sequentially reads the plurality of scan lines and then synchronously and selectively outputs the scan lines producing an output comprising one scan line representative of one lane or zone plus a predetermined amount of scan line data from an adjacent lane or zone or both adjacent lanes or zones.

12 Claims, 3 Drawing Sheets

METHOD AND APPARATUS FOR IMAGE OVERLAP PROCESSING

FIELD OF INVENTION

This invention relates to a method and apparatus for image overlap processing. In particular, this invention relates to a novel method for processing multiple streams of data for spatial imaging at the boundaries of the data without introducing spatial errors.

BACKGROUND OF INVENTION

Continuous high resolution surface inspection is one of the most demanding industrial vision applications. A typical high speed web inspection application inspects a web which is 24 inches wide, with a web velocity of 400 inches per second (2000 feet/minute), performs 100% surface inspection and detects defects as small as 0.020 inches. A vision system that inspects such a web requires a cross-web resolution of at least 2048 pixels and needs to continuously scan and process over 70 million pixels per second.

Line scan cameras used for surface inspection are based on a one dimensional image sensor. In order to achieve sufficient image resolution, many applications require more than one line scan camera to be used simultaneously to inspect the same object.

In the early stages of processing the pixels, spatial image processing operations, such as morphology or convolution analysis, are widely undertaken. Typically, one image is taken as input and one resultant image is produced as output.

There are three growing classes of image processing applications for which conventional spatial image operations are inadequate. These applications are ones that use multiple line scan cameras, multiple output line scan cameras, and multiple output area scan cameras. Each lane or image will produce a separate but concurrent stream of video data. A problem exists when performing a spatial image processing operation on image data that has been divided into lanes or multiple images.

The model which is used in spatial image processing is to consider an image which is comprised of a two dimensional matrix of picture elements or pixels. Each row of pixels in an image is called a scan line. For every input image pixel, a corresponding output image pixel is produced by a computation that takes as its input values, the input image pixel values from a predetermined region having a predetermined horizontal and vertical extent. The region that encloses the input image pixels for the spatial operation is called a "kernel".

When the center pixel of the spatial operator's kernel is well within the boundaries of a video lane, overlap processing is not a concern. When the center pixel is near an image boundary, pixel data from outside of the image boundary is not available for full spatial operation. In prior art systems, pixel data is either assumed or arbitrarily injected. If the image boundary is an edge of the field of view, the overlap processor must inject a fixed value (i.e. 0's or 1's) into the portion of the kernel that is beyond the image boundary. The end result is that the output image near a boundary is unreliable as a result of the introduced spatial errors at the boundaries.

For instance, if a blob is located near an edge of a video lane, the scan line camera will produce an image responsive to the blob. If a spatial image operation is applied to the blob using a series of 0's injected at the image boundary, the output image of the blob is reduced in size which may result in the blob being undetected. On the other hand, if a series of 1's are injected at the image boundary and the spatial operation is applied, the blob is expanded which may result in an unimportant blob being detected unnecessarily. Either result is undesirable.

The same problem exists for cameras that deliver their video on multiple outputs, such as multiple output line scan cameras and area cameras. If the image boundary is between adjacent fields of view, the overlap processor will still inject a fixed value into the portion of the kernel that is beyond the image boundary. Since the pixel values for the portion beyond the image boundary is continuously changing and unknown, injection of a fixed value introduces considerable error.

SUMMARY OF THE INVENTION

The disadvantages of the prior art may be overcome by providing an overlap processor which enables spatial operations to be performed seamlessly across adjacent images.

It is desirable to provide an overlap processor which borrows appropriate pixel video data from adjacent images to produce regions of artificial overlap so that spatial operations can be performed at the image boundaries without errors or discontinuities.

It is desirable to provide an overlap processor which receives and temporarily stores a plurality of aligned scan lines. Each scan line is representative of a lane or zone of an image. The processor sequentially reads the plurality of scan lines and then synchronously and selectively outputs the scan lines producing an output comprising one scan line representative of one lane or zone plus a predetermined amount of data from a scan line of an adjacent lane or zone or both adjacent lanes or zones.

According to one aspect of the invention, there is provided an overlap processor for generating an output stream of pixel data from a plurality of aligned input streams of pixel data representative of a lane of an image of an object. The overlap processor comprises a plurality of FIFO line buffers, a multiplexer and a controller. Each FIFO line buffer receives, stores and reads out, respectively, one of the plurality of aligned input streams. The multiplexer is connected to each of the plurality of FIFO line buffers. The multiplexer has an output for outputting the output stream. The controller is connected to each of the plurality of FIFO line buffers for sequentially reading out the plurality of aligned input streams. The controller is also connected to the multiplexer for switching the multiplexer between the plurality of FIFO line buffers. The controller switches the multiplexer for outputting the output stream of pixel data representative of one lane together with pixel data representative of a boundary region of an adjacent lane nearest the lane.

According to another aspect of the invention, there is provided a method of generating an output stream of pixel data from a plurality of aligned input streams of pixel data representative of a lane of an image of an object. The method comprises the steps of sequentially reading the plurality of aligned input streams of pixel data, and selectively switching between the plurality of input streams producing an output stream of pixel data which is representative of one lane together with pixel data representative of a boundary region of an adjacent lane nearest the lane.

DESCRIPTION OF THE DRAWINGS

In drawings which illustrate embodiments of the invention.

DESCRIPTION OF THE INVENTION

Figure 1:
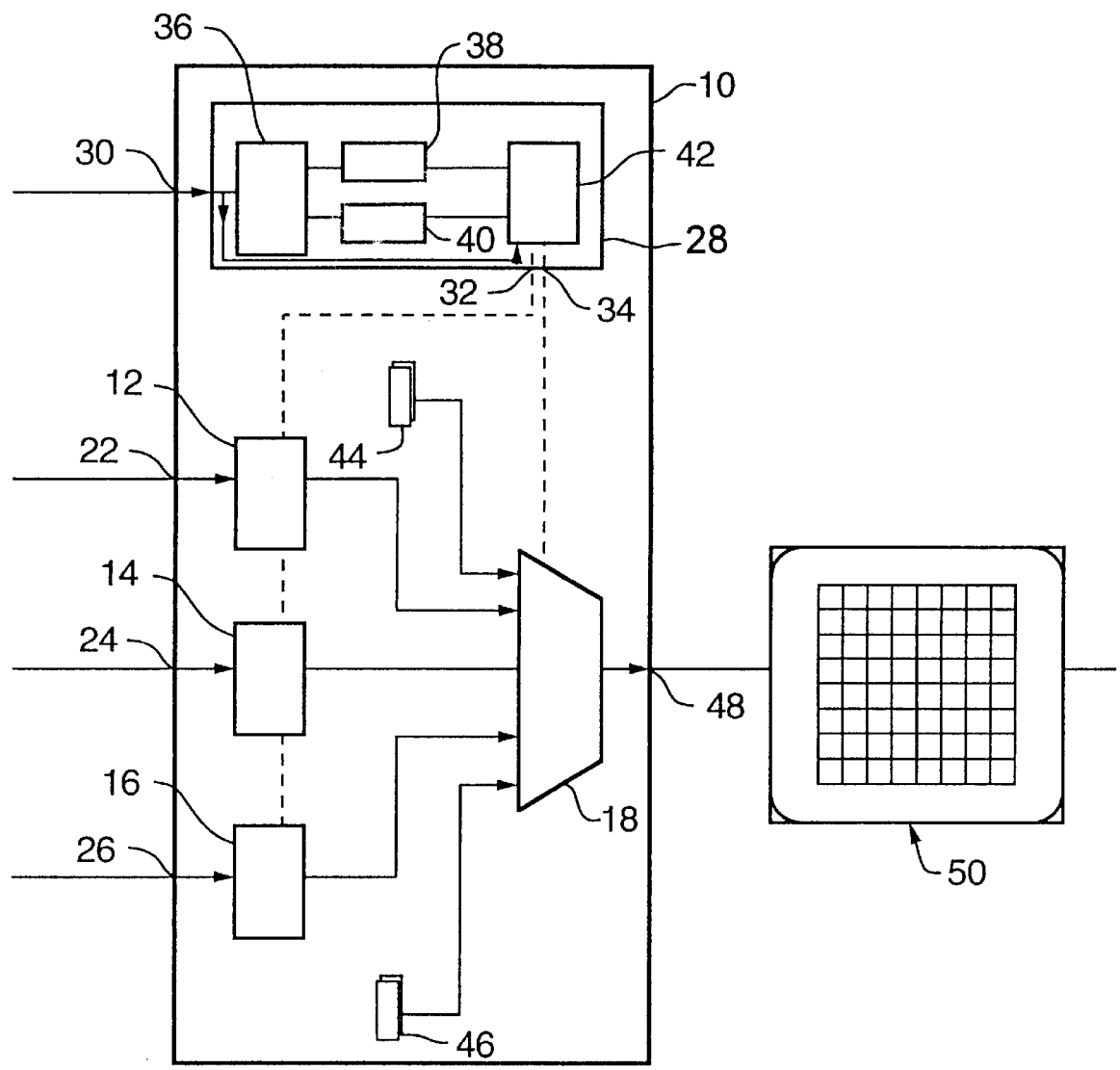
FIG. 1 is a schematic of the overlap processor of the present invention.

The overlap processor 10 of the present invention is generally illustrated in FIG. 1.

Overlap processor 10 generally comprises lead FIFO line buffer 12, center FIFO line buffer 14 and trail FIFO line buffer 16. Each of the output side of the FIFO line buffers, 12, 14 and 16, is electrically connected to zone multiplexer 18. Each of the FIFO line buffers 12, 14 and 16, respectively, has input taps 22, 24 and 26. Each FIFO line buffers 12, 14 and 16 receives, temporarily stores and responsive to an external signal and will read out stored data in a first in first out (FIFO) pattern.

Overlap processor 10 also includes an overlap processor controller 28. Controller 28 has a line valid signal input 30 and a FIFO control output 32 which is electrically connected to each of the FIFO line buffers 12, 14 and 16.

Overlap processor controller 28 has a multiplex control output 34 which is electrically connected to zone multiplexer 18 for effecting control of the output thereof.

Overlap processor 28 generally comprises a pixel counter 36, a detector 38, a detector 40 and a control logic 42. Pixel counter 36 is electrically connected to line valid signal input 30. Extending in parallel between pixel counter 36 and control logic 42 are detectors 38 and 40.

The output side of control logic 42 is electrically connected to FIFO control output 32 and multiplexer control output 34.

Zone multiplexer 18 also has a lead inject register 44 and a trail inject register 46. The output of zone multiplexer 18 is connected to the stitched video output 48 which is in communication with a spacial computational processor 50.

Figure 2:
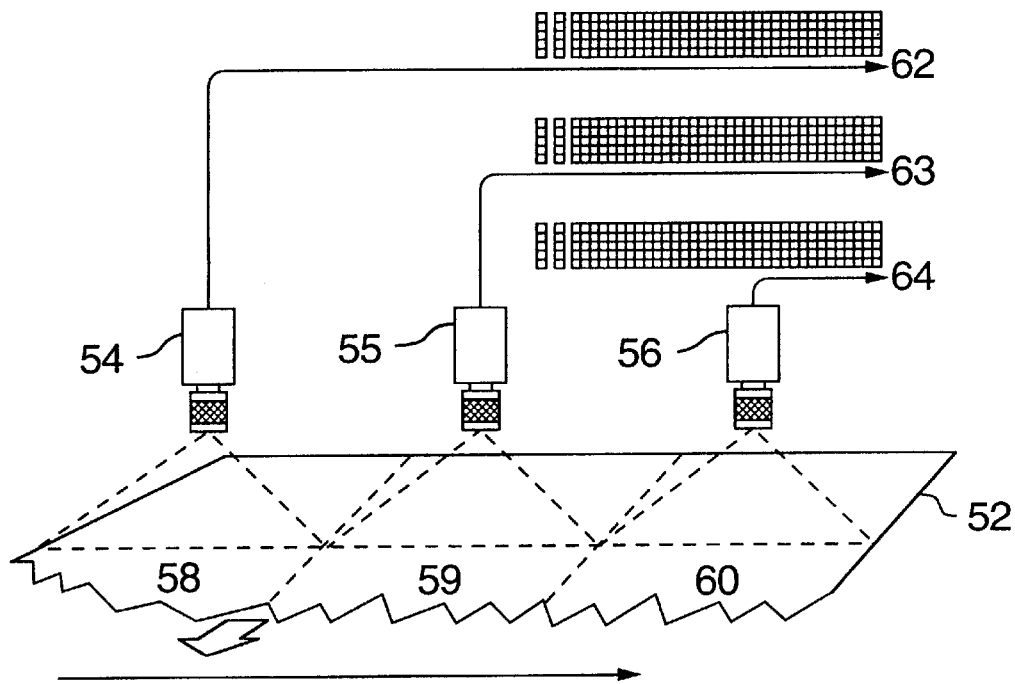
FIG. 2 is a schematic of a typical camera arrangement generating outputs for the overlap processor of FIG. 1.

Referring to FIG. 2, a typical web inspection system is schematically illustrated. A continuous web 52 which is being inspected, travels in the direction of the arrow. Line scan cameras 54, 55 and 56 are mounted relative to the web 52 to inspect lanes 58, 59 and 60 respectively. Line scan camera 54 will generate a video output 62, while line scan camera 55 will generate video output 63, while line scan camera 56 will generate video output 64. Although 3 line scan cameras have been illustrated, it is apparent that the present invention may be used with any number of cameras or with a camera having any number of internal lanes or zones.

Video outputs 62, 63 and 64 are electrically connected to lead input 22, center input 24 and trail input 26, respectively.

Figure 3:
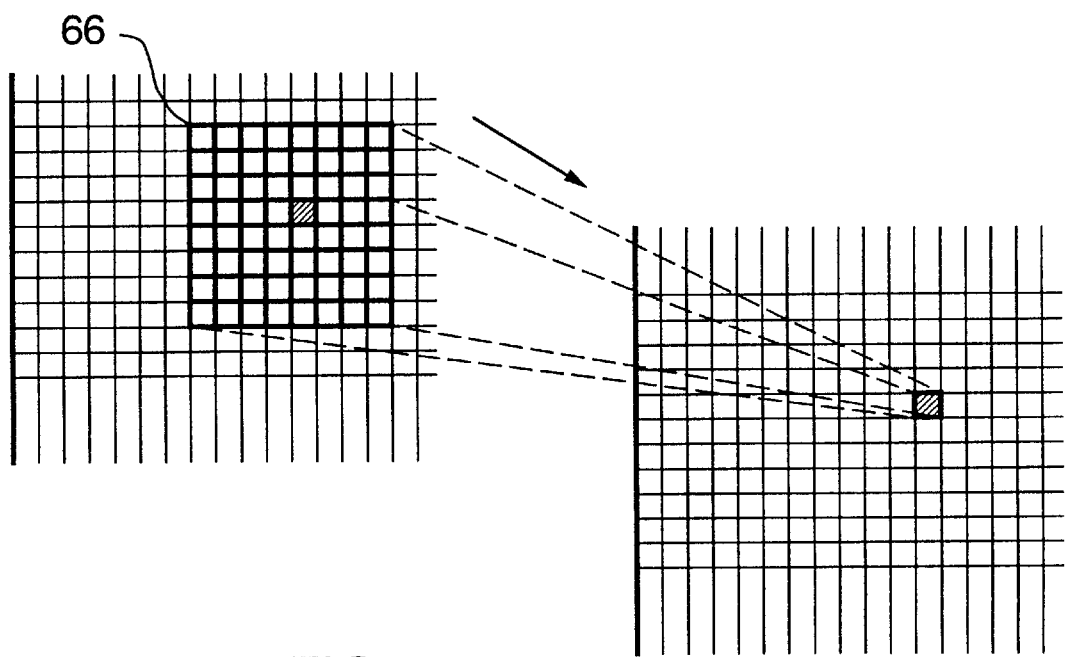
FIG. 3 is a schematic of an input scan line image with an output following spatial image processing.

Referring now to FIG. 3, spatial image processing is schematically illustrated. The left hand side of FIG. 3, illustrates an input image defined by pixels (n,m). For every input image pixel (n,m) a corresponding output pixel (n',m'), is produced by a computation that takes as its input values, the input image pixel values from the region enclosed by n±a, m±b, where 2a+1 and 2b+1 are the horizontal and vertical extent of the region of spacial operation. The region that encloses the input image pixels for spatial operation is called a "kernel". The kernel 66 can be arbitrarily shaped and does not necessarily have to be symmetrical, rectangular or filled. Examples of typical spatial processing include morphology and convolution analysis.

Figure 4:
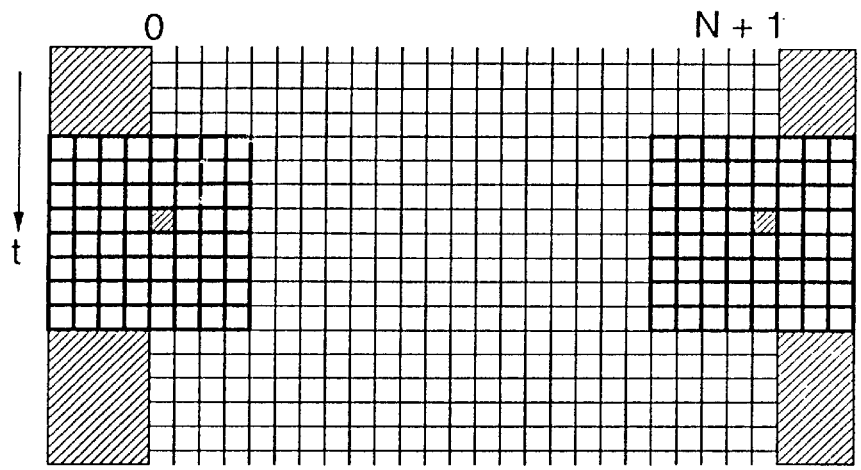
FIG. 4 is a schematic of an input scan line image illustrating the edges of the image relative to a kernel.

When the center pixel (n,m) of the spatial operator's kernel 66 is well within the boundaries of a video lane, overlap processing is not a concern. When the center pixel (n,m) is near an image boundary as illustrated in FIG. 4, pixel data from outside the image is not available.

Figure 5:
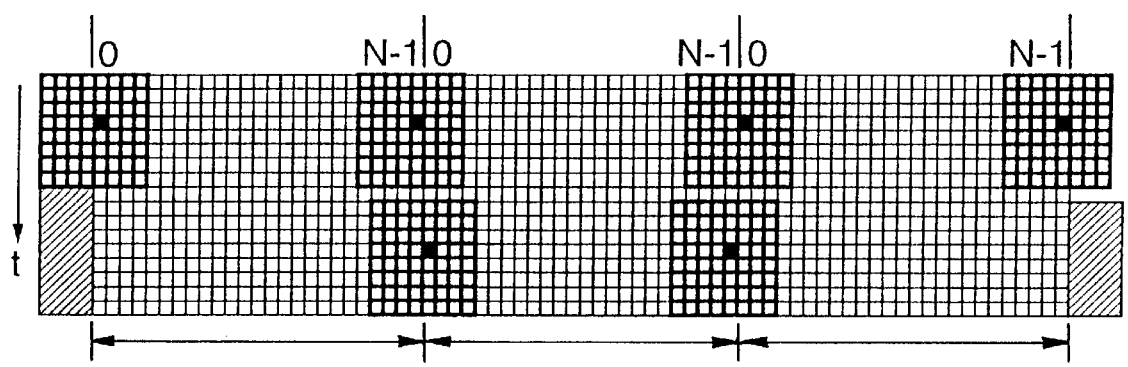
FIG. 5 is a schematic of three input scan line images in a side by side relation.

Referring to FIG. 5, an image of a web being inspected is divided into three lanes. When a boundary is between two adjacent images from two adjacent camera outputs or two adjacent cameras, video information must be acquired from the right side or lead zone of the adjacent image and from the left side or lag zone and "stitched" onto the video being presented to the computational processor.

Before the video information from adjacent images can be stitched, the adjacent video streams of video data must be precisely aligned with each other. In the case of a multitap camera the outputted video streams are fully synchronized and precisely aligned. Precisely aligned means that all streams are receiving pixels for the same horizontal scan line at the same time.

Figure 6:
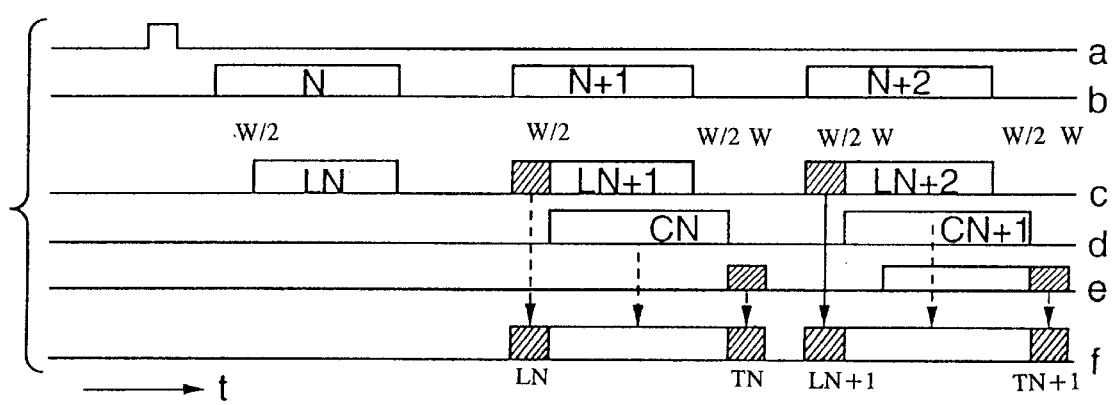
FIG. 6 is a time phase diagram of the scan line pixel data through the overlap processor of FIG. 1.

Referring now to FIG. 6, the stitching process is accomplished on a per-scan line basis. The overlap processor 10 has three video inputs: the center input 24 which is the main input being processed from line scan camera 55, the lead input 22, which is the input from line scan camera 54 which is adjacent scan line to the left in FIG. 2 and the trail input 26 which is the input from line scan camera 56 which is adjacent scan to the right in FIG. 2.

Each scan line is a series of digital video signals. Each digital video signal comprises a line valid signal (LVAL) and pixel data. For example, a sensor that produces an 8 bit video output would be represented by a 9-bit digital video signal comprising the 8 bit video data plus one line valid bit. The LVAL signal indicates the period during which the video data bits contain valid pixel data. The LVAL signal precedes the start of the video data by one clock cycle and ends at the start of the last pixel in the line of video data. The number of pixels per line is determined by the video sensor format, up to 16,384.

The output of the overlap processor 10 is a "stitched" video scan line including overlap zones that is presented to the input of the spatial computational processor 50.

At start up, a reset signal is generated by the control logic 42 which is delivered to each of the FIFO line buffers 12, 14 and 16. Following receipt of the reset signal all FIFO line buffers 12, 14 and 16 are empty. Since all three video streams are precisely aligned, the valid video pixels of the three video streams arrive simultaneously and are captured into the respective FIFO line buffers 12, 14 and 16. The previous tap from camera 54 is captured in the lead FIFO 12, the primary tap from camera 55 is captured in the center FIFO 14, and the trailing tap from camera 56 is captured in the trail FIFO 16.

Pixel counter 36 is a standard circuit which counts the number of pixels of each scan line which is entering each of the FIFO buffers 12, 14 and 16 following receipt of either a rising or falling edge of a LVAL signal. Detectors 38 and 40 are simple comparator circuits each of which receives an input from pixel counter 36 representative of the number of pixels counted and compares the number with a preset value.

In the case of detector 38, the value is set to a predetermined value of half the kernel width (W/2). Detector 40 is set to a predetermined value of the kernel width (W). Once each of the detectors 38 and 40 receives the corresponding value, a respective signal is delivered to the control logic 42.

Pixel counter 36 also includes a 2-bit counter for counting the number of scan lines passing through the overlap processor 10. Pixel counter 36 sends a signal to logic controller representative of the number of scan lines counted.

Control logic 42 is a standard circuit which will generate a signal responsive to the signals received from the pixel counter 36 and detectors 38 and 40. The signals generated by control logic 42 are delivered to the FIFO buffers 12, 14 and 16 for reading out the scan lines of pixel data stored therein and to the multiplexer 18 for switching between inputs for reading out a stitched video signal.

The individual read video streams show when the read operation is performed on each of the three FIFO line buffers 12, 14 and 16 and which scan line of pixels are present on each stream. Preferably, the stitched video stream is wider by an amount equal to the width of kernel 66. This length extension is typically removed as the video is processed by the computational processor 50.

There is a unique startup sequence immediately after reset, followed by a repeating FIFO access sequence for all subsequent lines. Following receipt of a rising LVAL signal, pixel counter 36 begins to count the number of pixels of a first scan line entering the FIFO buffers. Once the pixel counter 36 reaches the first predetermined value (W/2), detector 38 generates a signal for logic controller 42. Logic controller 42 then generates a lead read command signal for lead FIFO 12 to commence the read of video (LN) stored therein. The lead FIFO 12 read is initially delayed by width of kernel 66 divided by two (W/2) pixels from the first line valid (LVAL) rising edge and terminates coincident with LVAL. All of the remaining pixel data stored in FIFO line buffer 12 is held until a subsequent LVAL of a subsequent video line (N+1).

Once a subsequent LVAL of a subsequent scan line (N+1) is received, logic controller 42 sends a first switching signal to multiplexer 18 to begin receiving the scan line (LN) from FIFO 12 and to pass the scan line (LN) to the stitched video output 48.

Once the pixel counter 36 counts one video signal (N) and the first predetermined value (W/2), a signal is sent to logic controller 42 which issues a center read command signal to center FIFO 14. The center FIFO 14 read is thus initially delayed one entire scan line (N) from LVAL rising edge plus the width of kernel 66 divided by two (W/2) and is of length LVAL. All subsequent center zone reads are delayed by (W/2) and are of length equal to LVAL.

At the same time, logic controller 42 issues a second switching signal to multiplexer 18 to accept the scan line (CN) being read from center FIFO line buffer 12.

Once the pixel counter 36 counts two scan lines (N and N+1) and the first predetermined value (W/2) from the falling edge of LVAL, a signal is sent to logic controller 42 which issues a trail read command signal to trail FIFO 16 and a third switching signal is sent to multiplexer 18. Responsive to the third switching signal, the multiplexer 18 switches from receiving scan line (CN) from center FIFO 14 to scan line (TN) from trail FIFO 16.

The trail zone FIFO 16 read is initially delayed by two entire scan line trail edges plus the width of kernel 66 divided by two (W/2) and terminates a width (W) of kernel 66 pixels after the same scan line trail edge. All subsequent trail zone reads are delayed by W pixels from LVAL rising edge and are of length LVAL.

Once the pixel counter 36 counts two video signals (N and N+1) and the second predetermined value W, detector 40 sends a signal to logic controller 42 which issues a fourth switching signal to multiplexer 18. Responsive to the fourth switching signal, multiplexer 18 disables the output to output 48 or defaults to a disabled condition.

A single stitched video signal is thus generated at output 48. The stitched video stream is wider by an amount equal to the width of kernel 66.

The lead zone 58 and trail zone 60 being inspected by the cameras 54 and 56 are relative to the direction of the shift register of each of the cameras. All cameras 54, 55 and 56 must shift in the same direction. In FIG. 2, a horizontally extending arrow indicates the direction of shift of the shift registers in the example described herein.

To accomplish left and right edge zone injection, the zone multiplexer 18 is forced to select the inject register values from inject registers 44 and 46 instead of the lead FIFO line buffer 12 or the trail FIFO line buffer 16. Multiplexer 18 will read data streams from inject registers 44 and 46 which store values which are typically selectable to either all 1's or all 0's or a value between 0 to 256 for grey scale analysis.

For right edge zone, output 64 is connected to input 24 of center FIFO 14 and output 63 is connected to input 22 of lead FIFO 12. No input is connected to trail FIFO 16. In this case, logic controller will send a signal to multiplexer 18 to turn off the input from FIFO 16 and open receipt of trail edge register 46 to receive the data stored therein in replacement of FIFO 16. The overlap processor 10 operates in an identical manner producing a stitched video stream with edge data added for the spatial imaging processing.

Similarly for the left edge zone, output 62 is connected to input 24 of center FIFO 14 and output 63 is connected to input 26 of trail FIFO 16. No input is connected to lead FIFO 12. In this case, logic controller will send a signal to multiplexer 18 to turn off the input from lead FIFO 12 and open receipt of lead edge register 44 to receive the data stored therein in replacement of lead FIFO 12. The overlap processor 10 operates in an identical manner producing a stitched video stream with edge data added for the spatial imaging processing.

Spatial image processing undertaken by processor 50, will reduce the line video back to its original size.

It is possible to have left only, right only or left and right injection occurring.

It is apparent that the overlap processor 10 of the present invention has applications outside of web inspection. Although the overlap processor 10 is suited for use with visions systems such as the system described in commonly assigned application Ser. No. 08/169,665, filed Dec. 20, 1993, it is apparent that the overlap processor 10 has applications with a CCD camera which internally divides up the video image into lanes or zones.

It is now apparent to a person skilled in the art that there are numerous other modifications and purposes of this invention. It is to be understood that certain changes in design, size and components may be effective without a departure from the spirit of the invention and within the scope of the appended claims.

We claim:

1. A processor for generating an output stream of overlapping scan line data from at least two aligned input streams of scan line data comprising:

a first FIFO line buffer to receive and store a first one of said at least two aligned input streams of scan line data of a predefined length representing a first lane of an image and to output a first corresponding output stream;

at least one additional FIFO line buffer to receive a second one of said at least two aligned input stream of scan line data representing a second lane of said image, said second lane being adjacent said first lane and sharing a common edge therewith, and to output a second output stream corresponding to at least a portion of said second one of said at least two aligned input streams;

a multiplexer operably connected to said first FIFO line buffer and to said at least one additional FIFO line buffer to select between the output of said first FIFO line buffer and the output of said at least one additional FIFO line buffer for output from said processor;

a controller operably connected to said multiplexer and each of said first FIFO line buffer and said at least one additional FIFO line buffer, said controller responsive to a line valid signal to control said multiplexer to produce an output stream of overlapping scan line data of a length greater than said predefined length, said output stream of overlapping scan line data comprising a combination of said first corresponding output stream of scan line data output by said first FIFO line buffer and a predetermined amount of said second output stream of scan line data output by said at least one additional FIFO line buffer, said predetermined amount of said second output stream representing a portion of said second lane adjacent said common edge and said output stream of overlapping scan line data ordered to maintain said common edge of said first corresponding output stream adjacent said common edge of said portion of said second output stream.

2. A processor as claimed in claim 1 includes three input streams comprising a lead input stream, a center input stream and a trail input stream, and first, second and third FIFO line buffers, said second FIFO line buffer for receiving said lead input stream, said first FIFO line buffer for receiving said center input stream and said third FIFO line buffer for receiving said trail input stream, said multiplexer operable to select between said output of said first, second and third FIFO line buffers and said controller operable to control said multiplexer such that said output stream of overlapping data comprises a predetermined amount of said output stream of said second FIFO line buffer adjacent said output stream of said first FIFO line buffer adjacent a predetermined amount of said output stream of said third FIFO line buffer.

3. A processor as claimed in claim 2 wherein said output stream of overlapping scan line data is in an order corresponding to lead input stream, center input stream and trail input stream.

4. A processor as claimed in claim 3 wherein said order is relative to a direction of shifting of a register of a camera scanning said image.

5. A processor as claimed in claim 2 wherein said controller includes a pixel counter for counting pixels of scan line data and a scan line counter for counting scan lines and said controller controls said second FIFO line buffer to output after a predetermined number of pixels, controls said first FIFO line buffer to output after one scan line plus said predetermined number of pixels and controls said third FIFO line buffer to output after two scan lines plus said predetermined number of pixels.

6. A processor as claimed in claim 5 wherein initially said controller controls said second FIFO line buffer to output after one scan line and controls said first FIFO line buffer to output after one scan line plus said predetermined number of pixels and controls said third FIFO line buffer to output after two scan line plus said predetermined number of pixels and disables said output stream of overlapping scan line data after two scan lines plus twice said predetermined number of pixels and thereafter enables said output stream of overlapping scan line data at a start of each scan line and disables said output stream of overlapping scan line data after an end of each scan line plus twice said predetermined number of pixels.

7. A processor as claimed in claim 1 wherein said controller includes a pixel counter for counting pixels of scan line data and a scan line counter for counting scan lines, said controller being responsive to said pixel counter and to said scan line counter to produce said output stream of overlapping scan line data.

8. A processor as claimed in claim 1 wherein said processor further includes an edge register for injecting a stream of predetermined data into said output stream of overlapping scan line data when said processor includes only two aligned input streams of data.

9. An overlap processor as claimed in claim 8 wherein said predetermined steam of data comprises a value between 0 and 256.

10. A processor for generating an output stream of overlapping scan line data from three aligned input streams of scan line data, comprising:

a first FIFO line buffer for receiving, storing and outputting a first one of said three aligned input streams, said first one of said three aligned input streams having a redefined length and representing a first lane of an image, a second FIFO line buffer for receiving, storing and outputting a second of said three aligned input streams representing a second lane of said image, said second lane being adjacent to said first lane and sharing a common edge therewith and a third FIFO line buffer for receiving, storing and outputting a third of said three aligned input streams representing a third lane of said image, said third lane being adjacent to said first lane and sharing a common edge therewith;

a multiplexer connected to each of said first, second and third FIFO line buffers to select said first, second and third FIFO line buffers to output said data stored therein as said output stream said overlapping stream of scan line data;

a controller operably connected to each of said first, second and third FIFO line buffers and said multiplexer, said controller having an input for receiving a line valid signal of said scan line data, a scan line counter for counting said line valid signals and a pixel counter to count scan line pixels, said controller responsive to said scan line counter and to said pixel counter to produce said output stream of overlapping scan line data comprising said predefined length of said first input stream of scan line data, a predetermined length of said second input stream and a predetermined length of said third input stream, said first input stream and said predetermined lengths of said second and said third input streams arranged in said output stream of overlapping scan line data such that said common edge been said first and second input streams is adjacent within said output data stream and said common edge between said first and third input streams is adjacent within said output data stream and wherein initially said controller controls said second FIFO line buffer to output after one scan line and controls said first FIFO line buffer to output after one scan line plus a predetermined number of pixels and controls said third FIFO line buffer to output after two scan lines plus said predetermined number of pixels and disables said output stream of overlapping scan line data after two scan lines plus twice said predetermined number of pixels and thereafter enables said output stream of overlapping scan line data at a start of each scan line and disables said output stream of overlapping scan line data after an end of each scan line plus twice said predetermined number of pixels.

11. A method of generating an output stream of overlapping scan line data from first, second and third aligned input streams of scan line data representative of three adjacent lanes of an image, said first input stream having a first edge common with said second input stream and a second edge common with said third input stream, the steps comprising:

reading each of said first, second and third input streams, receiving a line valid signal of said scan line data, responsive to said line valid signal, outputting a predetermined amount of said second input stream, said predefined length of first input stream and a predetermined amount of said third input stream, said output stream arranged such that said common edge between said first and second input streams is adjacent within said output stream and said common edge between said third and first input streams is adjacent within said output stream.

12. A method as claimed in claim 11 wherein said method further comprises the steps of counting pixels of scan line data read in said input streams and counting scan lines read in said input streams and said steps of reading and outputting are responsive to counting a predetermined number of pixels and scan lines.

* * * * *